United States Patent [19]
Jourdan

[11] 4,404,623
[45] Sep. 13, 1983

[54] METHOD AND APPARATUS FOR BALANCING FLUX IN A POWER TRANSFORMER CIRCUIT

[75] Inventor: Charles S. Jourdan, Apopka, Fla.

[73] Assignee: Florida Computer Graphics, Lake Mary, Fla.

[21] Appl. No.: 371,443

[22] Filed: Apr. 23, 1982

[51] Int. Cl.³ .............................................. H02H 7/122
[52] U.S. Cl. ........................................ 363/56; 363/17; 363/26; 363/80; 363/97
[58] Field of Search .................... 363/25, 26, 17, 56, 363/79, 80, 97

[56] References Cited

U.S. PATENT DOCUMENTS

| | | | |
|---|---|---|---|
| 3,859,583 | 1/1975 | Reed | 363/26 |
| 3,859,586 | 1/1975 | Wadlington | 363/56 |
| 4,002,963 | 1/1977 | Hunter | 363/56 X |
| 4,150,424 | 4/1979 | Nuechterlein | 363/26 |
| 4,291,366 | 9/1981 | Nelson | 363/17 |
| 4,307,441 | 12/1981 | Bello | 363/97 X |

*Primary Examiner*—William M. Shoop
*Attorney, Agent, or Firm*—Duckworth, Allen, Dyer & Pettis

[57] ABSTRACT

Method and apparatus are disclosed for use with switching power transformer circuits for balancing and compensating for core flux caused by unswitched D.C. current flowing in the transformer. A method and apparatus for adjusting the duty cycle of the switching portion of the power transformer circuit serves to balance the flux present in the transformer core during each half cycle of the operation of the circuit.

10 Claims, 30 Drawing Figures

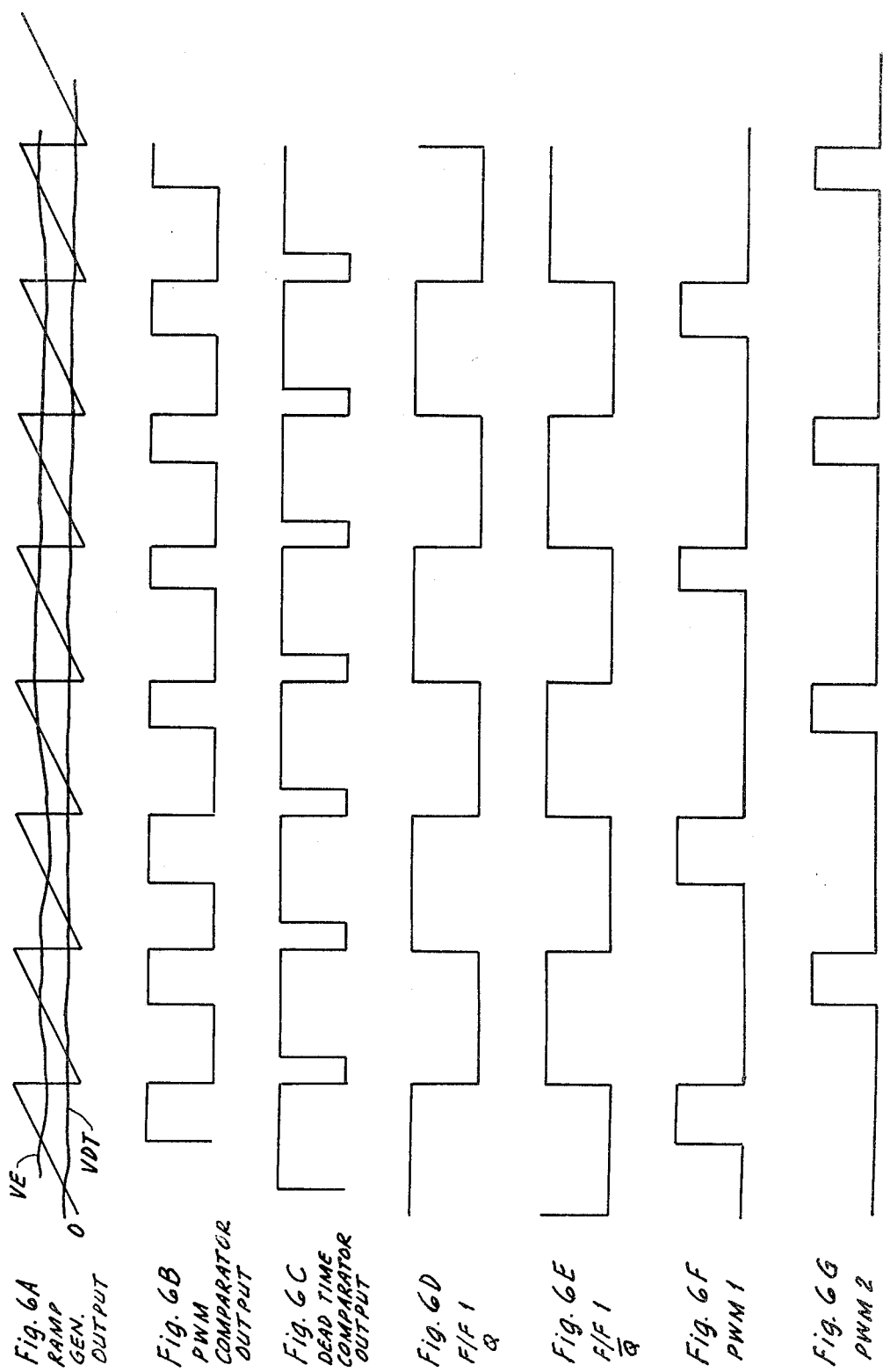

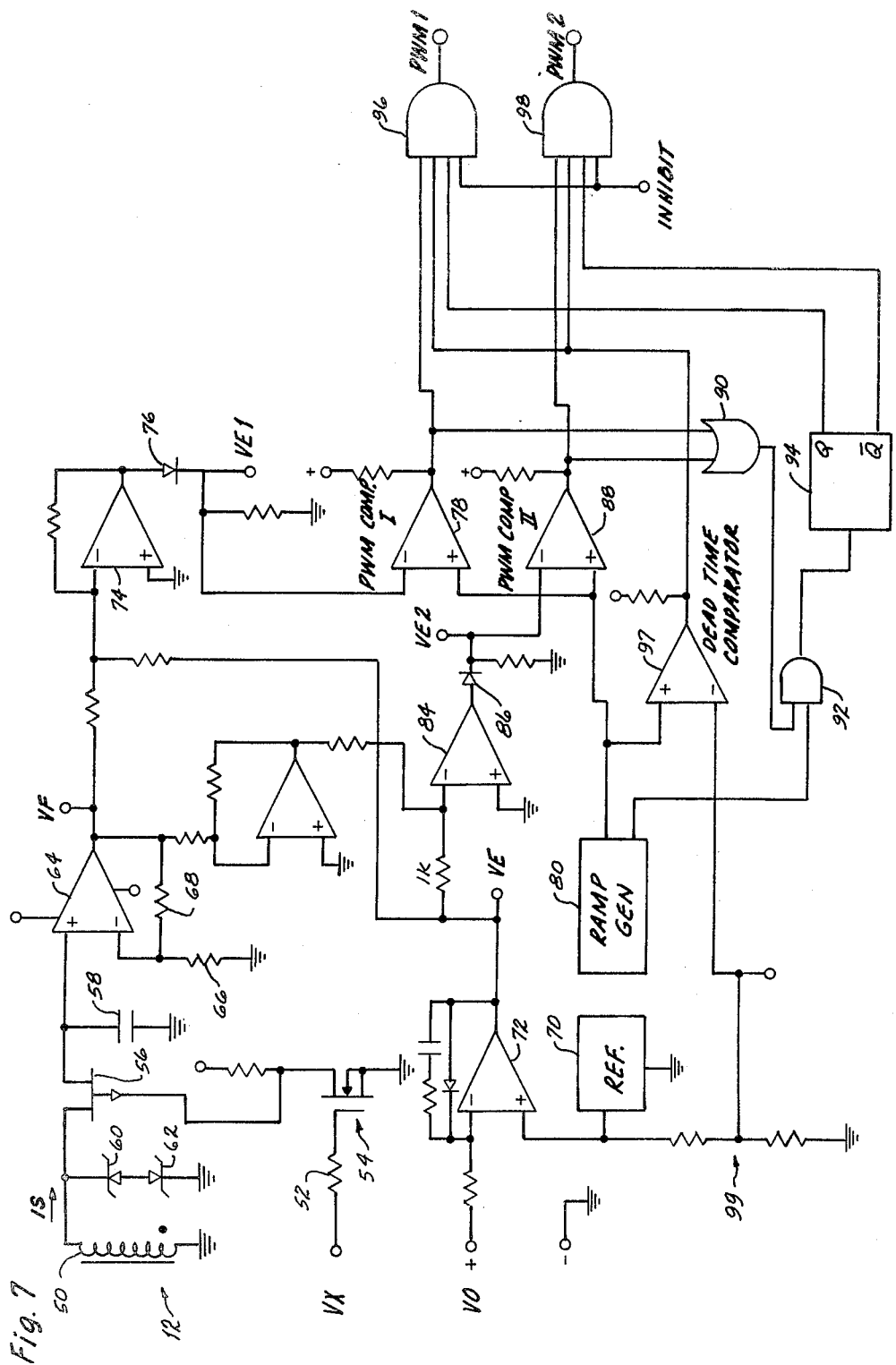

RAMP GEN.
OUTPUT  VDT  VE  VE2  VE1

PWM COMPARATOR
II OUTPUT

PWM COMPARATOR
I OUTPUT

DEAD TIME
COMPARATOR
OUTPUT

F/F1 Q̄

PWM 1

PWM 2

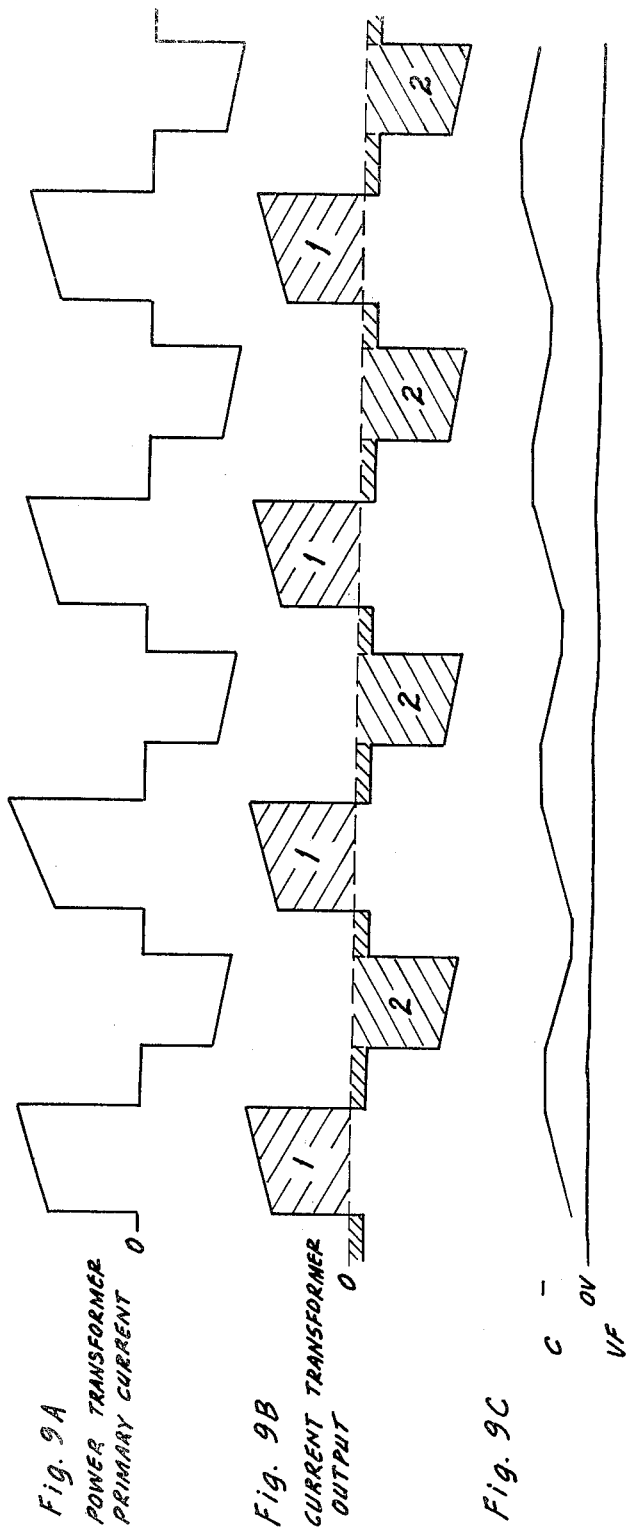

METHOD AND APPARATUS FOR BALANCING FLUX IN A POWER TRANSFORMER CIRCUIT

BACKGROUND OF THE INVENTION

This invention relates generally to switching power transformer circuits. More particularly, it relates to such circuits that employ pulse width modulation of a signal that approximates a square wave for regulation of output voltage.

The invention may advantageously be used with power supplies, particularly D.C.-to-D.C. convertors of the half-bridge, full-bridge, or push-pull type, although it is also suitable for numerous other transformer circuit applications.

Conventional half-bridge, full-bridge and push-pull convertors, although widely used, suffer from a tendency toward power transformer core saturation. This saturation results from unswitched D.C. currents flowing in the primary or secondary windings. This core saturation may lead to catastrophic failure or erratic circuit operation. The undesirable saturation may result from power transistor mismatch, rectifier forward voltage mismatch, winding resistance mismatch, or, in bridge-type circuits, from D.C. input voltage differences caused by input filter capacitor mismatch or other anomalies in the input circuit.

In certain prior art circuits a D.C. blocking capacitor is inserted in series with the power transformer primary winding. Other prior art circuits rely upon matching of power transistors or upon air gaps in the power transformer core, or upon both of these techniques. Some prior art circuits require the use of stepped gaps in the power transformer core along with an additional winding on the transformer to sense the effects of D.C. current. Still other circuits alter the voltage regulation feedback circuit in such a way to change the convertor operation to simulate a current-fed type.

The solutions attempted by the prior art noted above all suffer from various disadvantages. D.C. blocking capacitors generally are applicable only to the bridge type of convertors, and their use may cause unequal voltage stress on output rectifiers. Such a capacitor must conduct the full power transformer primary current and may thus be unreliable. Also, more than one capacitor may be required in high current applications. The matching of power transistors, while addressing the problem, is both costly and unreliable. The use of transformer air gaps decreases the power transformer primary inductance, thus increasing maximum current that must be conducted by the power transistors. Also, air gaps increase transformer leakage flux that may interfere with other portions of the circuitry. Complex transformer designs, such as the use of stepped gaps in the power transformers are expensive and difficult to design and tie the transformer design very closely to that of the control circuit, requiring custom designing for each different circuit. Alteration or manipulation of the voltage regulation feedback control circuits may cause difficulties when the circuit is operating under light loads or in the presence of line and load transient conditions, and they usually require additional circuitry to correct for these weaknesses. Such control circuit manipulation also must be designed in close relationship to the voltage control loop and may thus make the control loop difficult to optimize for operation and difficult to analyze.

SUMMARY OF THE INVENTION

In view of the foregoing difficulties of the prior art, it is an object of the present invention to provide apparatus capable of sensing and correcting for any D.C. current that may be present in the power transformer winding. It is a further object of this invention to effect such correction without compromising the operation of the voltage control feedback circuit. It is yet another object of the present invention to provide such apparatus that is applicable to a wide range of power transformer circuits.

To achieve the foregoing objects, and others that will become readily apparent from the following disclosure, a method and apparatus are disclosed for balancing transformer flux in a switching power transformer circuit that employs pulse width modulation for regulation of output voltage and is driven by an input signal that approximates a square wave, which circuit switches for each respective half cycle of operation between a first circuit section having during the active portion of its operation a first output signal having a first polarity and a second circuit having during the active portion of its operation a second output signal with a polarity opposite the first polarity, which circuit includes a current sensing device connected in series with the primary winding of the power transformer, which circuit generates a voltage error signal by comparing the output voltage against a referenced voltage, and which circuit includes a ramp signal generator for generating a ramp signal. The apparatus of this invention includes structure for effecting the various steps of the inventive method. The steps of the method include generating a signal proportional to the current flowing in the primary winding of the power transformer during the active portion of each half cycle of operation of the circuit during which the current sensing device and power transformer are being driven by that circuit. Additional steps include integrating the power transformer current-proportional signal with time to generate a flux error signal, combining the flux error signal with the voltage error signal to generate a first combined signal and comparing the first combined signal with the ramp signal and generating from the comparison a signal for controlling the operation of the first circuit section. By this method the duty cycle of the first circuit section may be adjusted to drive the flux error signal and thus the direct current flux in the power transformer toward zero. In a preferred embodiment of the invention the method and apparatus are applied alternately to each of the two circuit sections.

BRIEF DESCRIPTION OF THE DRAWING

A preferred embodiment of the method and apparatus of this invention will be described in detail with reference to the following drawings in which:

FIGS. 6A through 6G is diagram of the operating wave forms typically associated with the control circuit of FIG. 5;

FIG. 7 is a schematic diagram of the flux balancing apparatus of this invention;

FIGS. 9A and 9B are wave forms illustrating typical current flow in the power transformer and current transformer of this invention, and FIG. 9C is a diagram of the integral of the D.C. flux to be compensated by the method and apparatus of this invention.

DESCRIPTION OF A PREFERRED EMBODIMENTS

Figure 1:
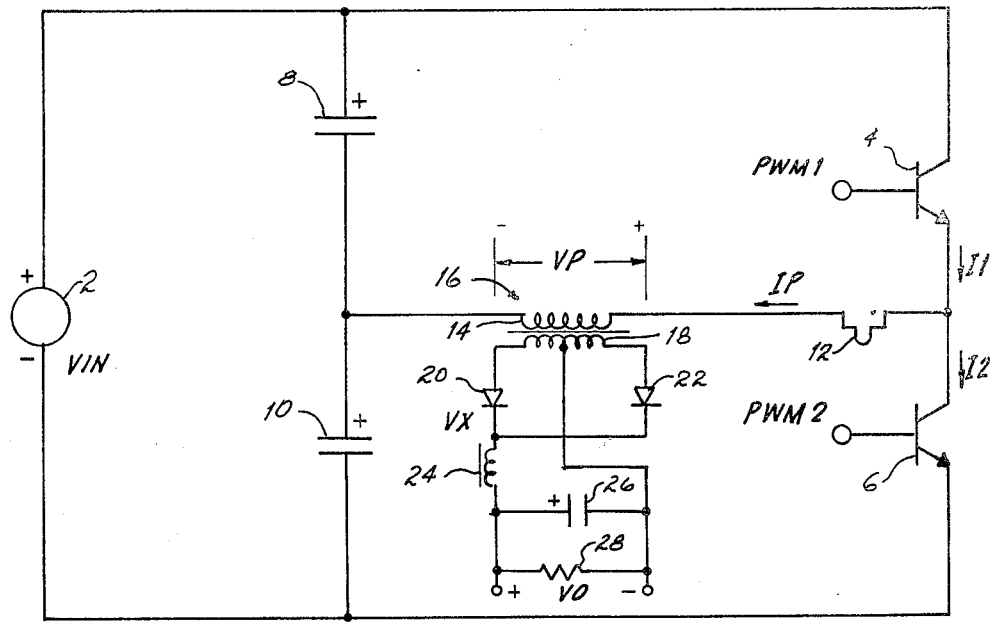
FIG. 1 is a schematic diagram of a half-bridge, D.C.-to-D.C. convertor circuit.
Figure 2:
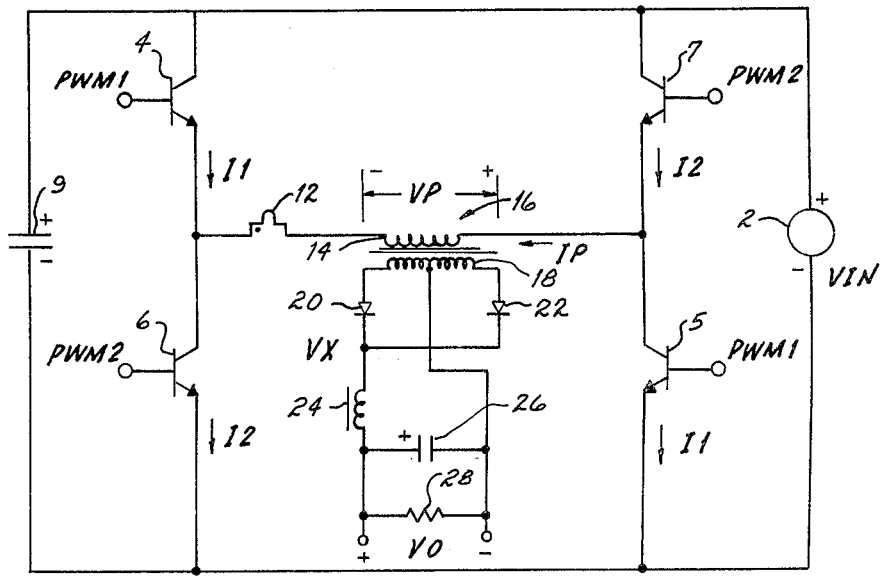
FIG. 2 is a schematic diagram of a full-bridge D.C.-to-D.C. convertor circuit.
Figure 3:
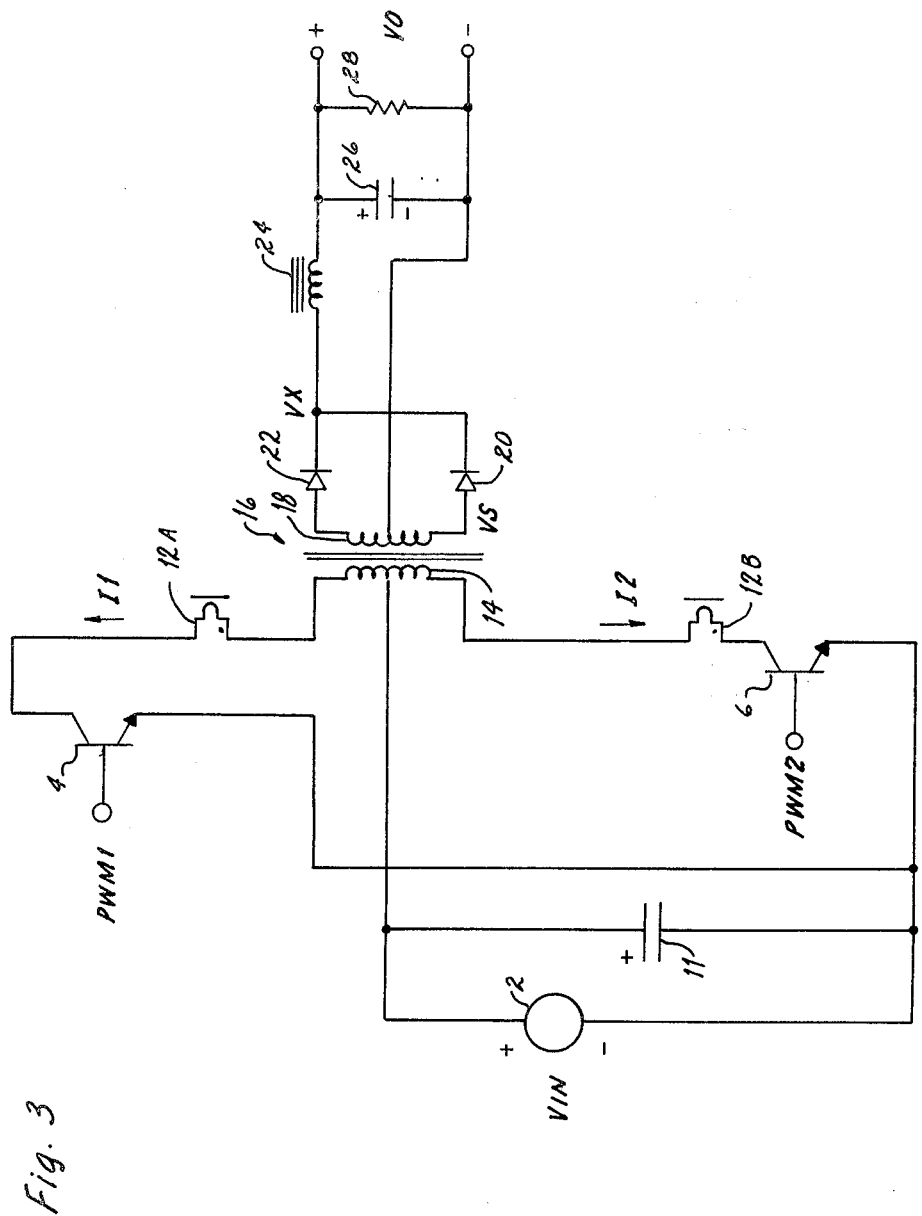
FIG. 3 is a schematic diagram of a push-pull D.C.-to-D.C. convertor circuit.

FIGS. 1 through 3 depict typical D.C.-to-D.C. switching power supply circuits of the half-bridge, full bridge and push-pull types, respectively. As these circuits are conventional and well known in the art, they are illustrated qualitatively, without the assignment of particular values to the components. To the extent that functionally corresponding components are used in each of the circuits of FIGS. 1 through 3, the same reference designators are likewise used.

With initial reference to FIG. 1, an input power source 2 is provided and may suitably be a direct current (D.C.) source such as a battery, D.C. generator, fuel cell, or the like, or may be a rectified and filtered alternating current (A.C.) input. The input voltage from source 2 is applied in parallel across power transistors 4 and 6 and capacitors 8 and 10. The operations of power transistors 4 and 6 are controlled, respectively, by the signals of a first pulse width modulator signal PMW1 and a second pulse width modulator signal PWM2, described below. The pulse width modulator control signals serve to alternate the active operation of the first section of the circuit, which section includes first power transistor 4 with the active operation the second section of the circuit, which includes the second power transistor 6. Conventionally, the pulse width modulation signal applied to the power transistors 4 and 6 will approximate the form of a square wave (FIGS. 4A and 4B), for purposes to be described below.

Figure 4:
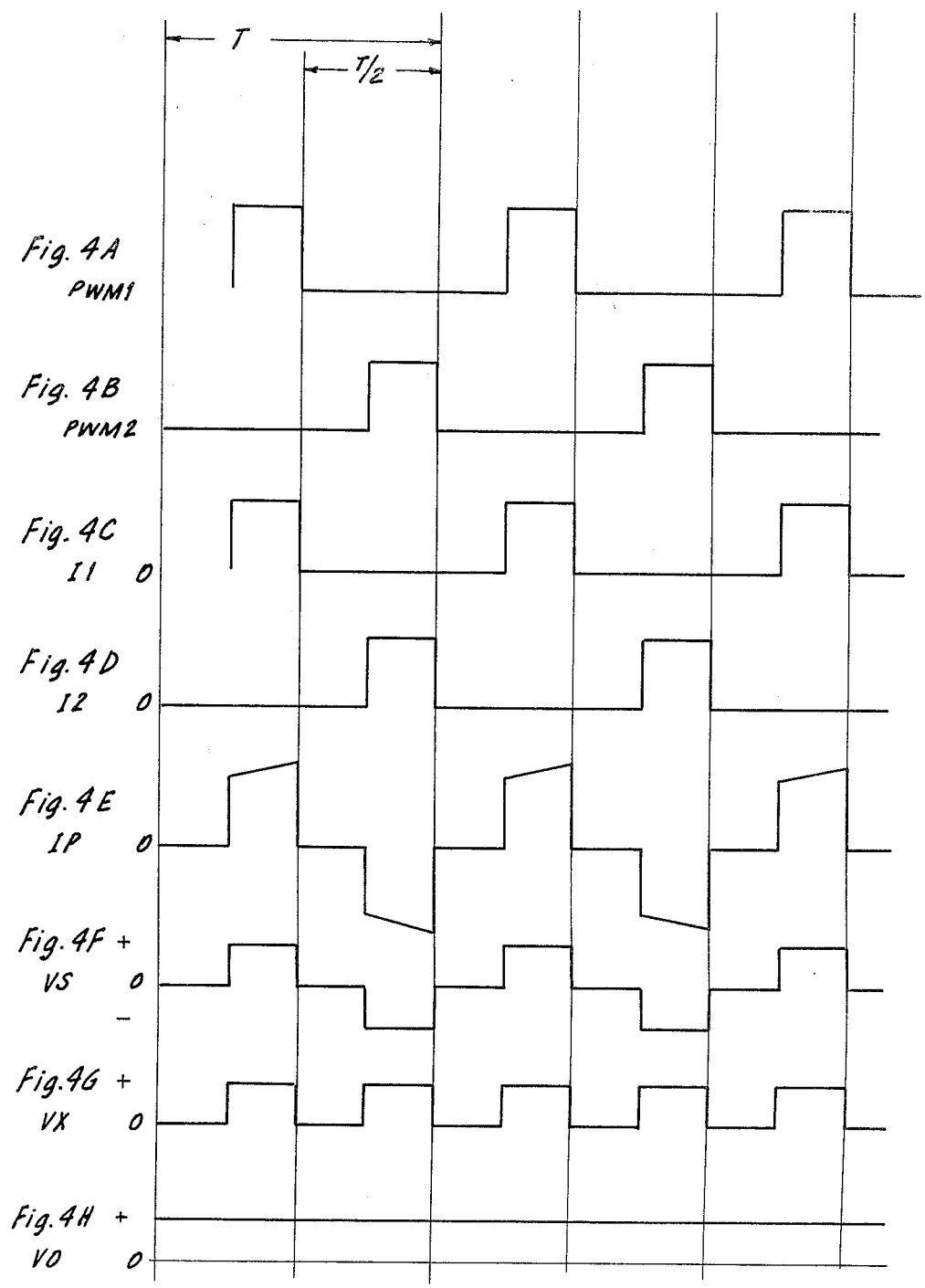
FIGS. 4A through 4H are diagrams of typical operating wave forms of the circuits of FIGS. 1 through 3.

By the alternate activation of first and second power transistors 4 and 6, with the currents I1 and I2, respectively, flowing through those power transistors and thus the first and second circuit sections, the wave form of the current IP flowing through the primary winding of current sensing device 12, which may conveniently be a current transformer, will likewise approximate a square wave. Connected in series with the current transformer 12 is the primary winding 14 of the power transformers 16, the opposite end of which is connected between capacitors 8 and 10. It is to be understood that the operating frequency of the square wave signal, the input voltage, power level and number of windings on the power transformer are completely arbitrary and may be chosen as suitable by those skilled in the art. VP is shown in FIG. 1 as well as in FIGS. 2 and 3, as being the potential across the primary of the power transformer 16. The output (VS shown in FIG. 4F) of the secondary winding 18 of power transformer 16 is rectified by suitable rectifiers 20 and 22 to provide the rectified secondary wave form VX (FIG. 4G). This wave form is filtered by an L-C network 24, 26 to provide a D.C. output voltage VO (FIG. 4H) that is proportional to the input pulse width (from signals PWM1 and PWM2) to power transistors 4 and 6.

FIG. 2 depicts a conventional full bridge circuit, whose components are generally analogous to those of the circuit of FIG. 1. In addition, there are power transistors 5 and 7 connected in parallel to power transistors 4 and 6 and controlled by the signals PWM1 and PWM2 from the first and second pulse width modulators, respectively. Capacitor 9 is connected in parallel with power transistors 4 and 6. This full bridge circuit will display wave forms I1, I2, IP, VS, VX and VO that are generally analogous to the corresponding wave forms for the circuit of FIG. 1, which wave forms are illustrated in FIGS. 4A through 4H.

In FIG. 3 is shown a typical push-pull D.C.-to-D.C. convertor whose components are likewise generally analogous to those of the circuits of FIGS. 1 and 2. However, the current transformer 12 of those previous circuits is replaced as shown with a dual primary current transformer whose primary windings are denoted as 12A and 12B, respectively. A capacitor 11 is connected across the input voltage as indicated. As with FIGS. 1 and 2, the relevant wave forms of this circuit are qualitatively illustrated in FIGS. 4A through 4H.

Figure 5:
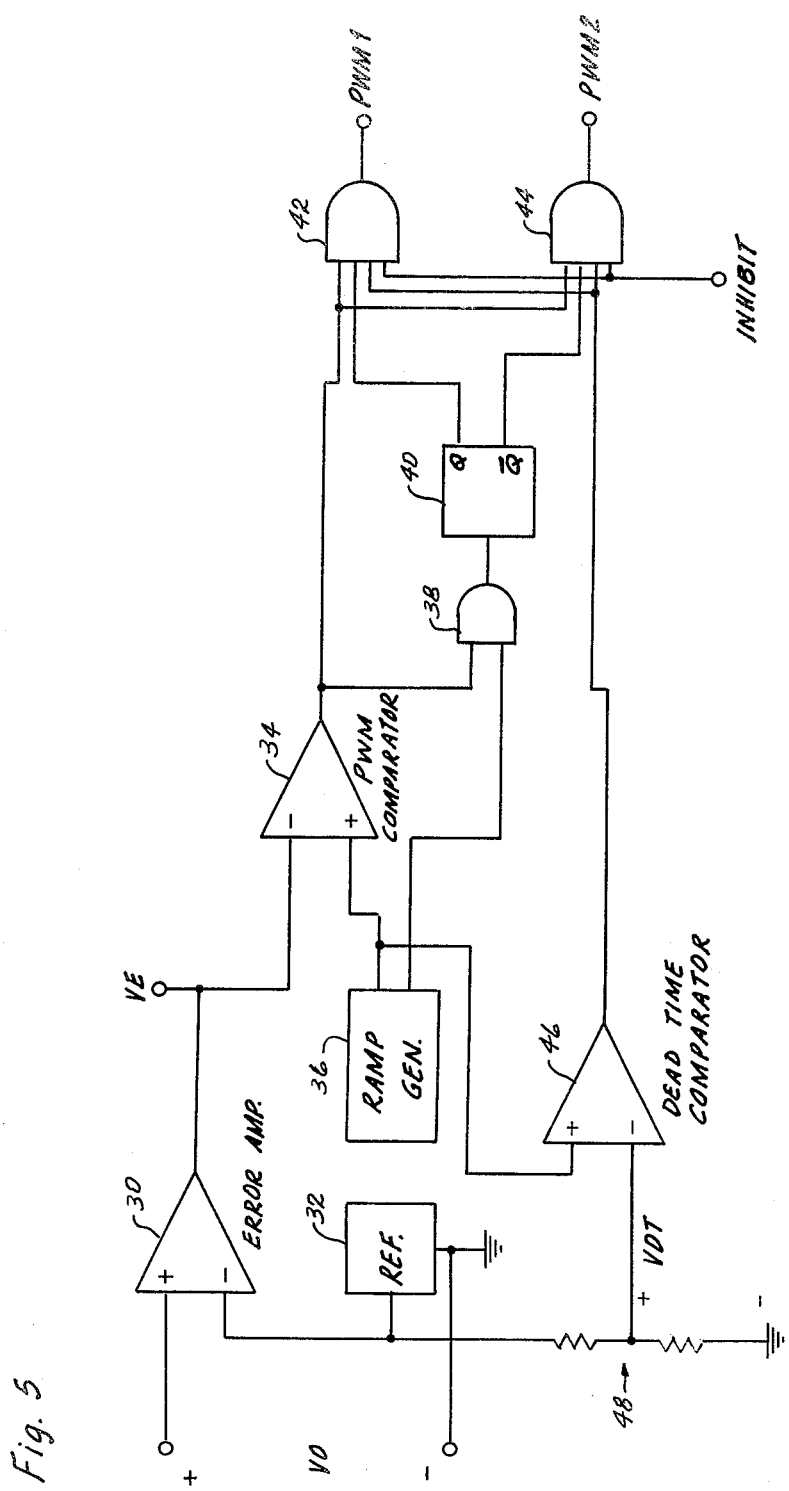
FIG. 5 is a simplified schematic diagram of a conventional prior art control circuit.

A conventional prior art pulse width modulation control circuit, such as might be used with the convertor circuits of FIGS. 1 through 3, is illustrated in FIG. 5. This circuit includes an error amplifier 30 into which are fed the output voltage VO, suitably from a circuit such as one of those illustrated in FIGS. 1 through 3, and a stable reference voltage from a reference source 32. The error amplifier 30 compares the output voltage VO with the reference voltage supplied by source 32 and generates an error voltage output VE. This error voltage VE is compared, by comparators 34 with the ramp signal provided by ramp generator 36. The output of the comparator 34 (which comparator thus serves as the pulse width modulator (PWM) comparator) is then gated with a synchronizing signal also provided by ramp generator 36 through AND gate 38. The output signal from gate 38 toggles the steering flip-flop 40 between output Q and $\overline{Q}$. These outputs Q and $\overline{Q}$ from steering flip-flop 40 control the output gates 42 and 44 and thus apply the output of the comparator 34 alternately to the power transistors 4 and 6 in the circuits of FIGS. 1 through 3 (and power transistors 5 and 7 in FIG. 2, as well).

The dead time comparator 46 receives one input (VDT) from voltage divider 48 and another from ramp generator 36 to provide an output signal indicating the predetermined period of dead time between the alternating activation of gates 42 and 44. This prevents the output transistors receiving the PWM1 and PWM2 signals from being switched on simultaneously; the amount of predetermined dead time is established by the voltage divider 48.

FIGS. 6A through 6G illustrate typical wave forms associated with the circuitry of FIG. 5. In FIG. 6A is illustrated the ramp generator sawtooth output plus the error voltage signal output from error amplifier 30 and the dead time comparator input VDT. The output of PWM comparator 34 is illustrated in FIG. 6B as approximating a square wave whose pulse width is controlled by the comparison between VE and the ramp signal of FIG. 6A. The dead time comparator output of FIG. 6C is likewise an approximation of a square wave resulting from the comparison between the ramp signal and VDT in FIG. 6A. FIGS. 6D and 6E illustrate the switching between the outputs Q and Q̄ in the flip-flop 52. Finally, FIGS. 6F and 6G illustrate the output signals PWM1 and PWM2 from the gates 42 and 44, respectively, being generally the alternating application of the output of PWM comparator 34 to gate 42 and gate 44.

FIG. 7 is a schematic diagram of a pulse width modulation control circuit employing the flux balancing apparatus of the present invention. The basic circuit operation is generally similar to that of the control circuit of FIG. 5, the principal differences being the inclusion of the flux balancing apparatus of this invention.

As noted with respect to FIGS. 1 through 3, the current sensing device, conveniently in the form of the primary winding of current transformer 12, is connected in series with the primary winding 14 of power transformer 16. Thus the current flowing in the primary windings of both transformers will be substantially the same, so that the current transformer 12 may sense the primary current of the power transformer 16. A typical current wave form for the current flowing in the power transformer primary winding and containing an unswitched, net D.C. average is shown in FIG. 9A.

The current in the current transformer 12 secondary winding is proportional to the current flowing in the primary winding, being a replica of the primary current divided by the transformer turns ratio, which may suitably be on the order of 200:1. However, as the current transformer cannot pass to the secondary winding any net D.C. current that may be present in the primary, the wave form of FIG. 9A reflected to the secondary winding of the current transformer 12 is as shown in FIG. 9B. Because the current transformer 12 can pass no D.C., the areas of the wave form above and below ground must be equal, thus resulting in the overall downward shift of the wave form illustrated in FIG. 9B, as compared with that of FIG. 9A.

In the circuit of FIG. 7 the signal VX, which is the rectified wave form from the secondary of the power transformer 16, is applied through a suitable resistor 52, to synchronous integrator driver 54, which may suitably be Intersil type IVN5001. This driver 54 is essentially an inverting buffer that senses the active portions of operation of the appropriate circuit of FIGS. 1 through 3 and applies the wave form indicating those active portions of the operation to the gate of the switching device 56, which may suitably be a Jfet chopper such as a Siliconix type J174. Thus the switching device 56 will pass the secondary current wave form IS only when one or the other of the power transistors 4 or 6 of the applicable circuits of FIGS. 1 through 3 is turned on, thus providing for active operation of one of the two circuit sections of the applicable circuit.

As noted above, the secondary winding 50 of current transformer 12 provides a D.C. signal IS during the times that the switching device 56 is activated, and this signal IS is passed to integrating means 58. This provides integrating device 58, which may suitably be a capacitor, with a signal that is proportional to the current flowing in the primary winding of the power transformer during the active portion of each half cycle of operation of the applicable circuit of FIGS. 1 through 3, when the current transformer and the power transformer are being driven by that circuit. Clamping diodes 60 and 62 are provided between the output of current transformer 50 and ground to prevent saturation of the current transformer 12 when the switching device 56 is turned off.

The integrating device, 58, suitably a capacitor of arbitrary capacitance, serves as a true integrator, having infinite gain under the application of direct current and charges to a voltage proportional to the time integral of the current IS, synchronously with the operation of the circuit sections of the applicable convertor circuits of FIGS. 1 through 3. As shown on FIG. 9C the integrating device 58 will charge to a voltage proportional to the area 1 under the wave form of FIG. 9B when the first circuit section having the first power transistor 4 is on, then hold constant when both circuit sections, and both power transistors 4 and 6, are off, then discharge by an amount proportional to area 2 under the wave form of 9B when the second convertor circuit section, containing the second power transistor 6, is turned on.

The wave forms of FIGS. 9A and 9B represent a typical situation in which component mismatch or some other anomaly in the circuit causes one of the circuit sections (in this case the first circuit section) to be turned on longer then the other circuit section. In FIG. 9 the shaded areas between adjacent areas 1 and 2 represent the D.C. unswitched current present during the dead time when both circuit sections are turned off. FIG. 9C illustrates the time integral of this wave form of FIG. 9B, increasing by an amount proportional to the area 1 when the first circuit section is turned on, holding constant when both circuit sections are turned off, and then decreasing, or discharging, by an amount proportional to the area 2 when the second circuit section is turned on. Because area 1 is greater than area 2, FIG. 9C indicates the retention of an increasingly negative D.C. voltage in the integrating device 58. The voltage on the integrating device 58 is then amplified by the flux error amplifier 64 to provide as an output the flux error signal VF. The gain of this amplifier 64 is controlled by the resistors 66 and 68, which may have values, respectively, of 1,000 ohms and 10,000 ohms. Except as otherwise specified, typical values for various resistors shown in FIG. 7 may suitably be on the order of 1,000 ohms. As is readily apparent to those skilled in the art, numerous of the resistors capacitors and diodes included are provided for well-known circuitry applications such as balancing and adjustment purposes.

A voltage error signal VE is provided by comparing the output of a stable reference voltage source 70 with the output voltage VO from the applicable circuit of FIGS. 1 through 3. This comparison is done in voltage error amplifier 72.

Figure 8A:
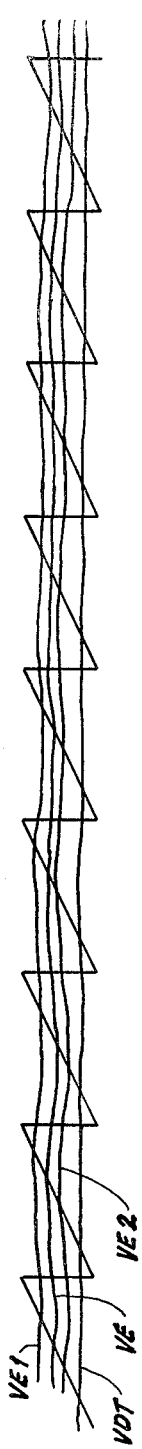
FIGS. 8A through 8AG are diagrams of operating wave forms typically associated with the apparatus of FIG. 7.
Figure 8B:
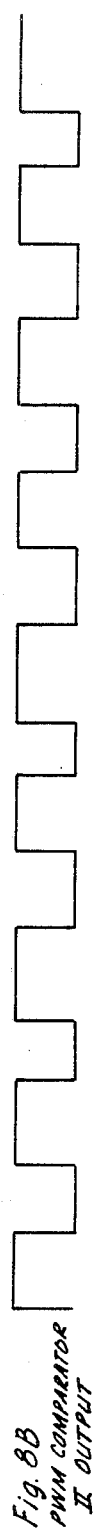
Figure 8C:
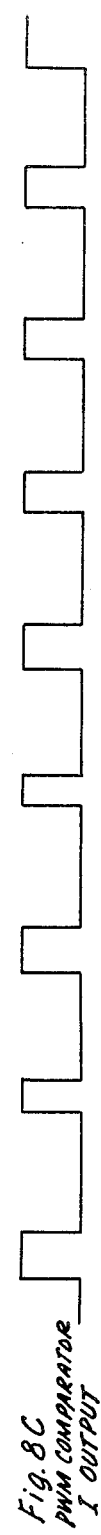

The flux error signal VF from amplifier 64 is then summed by summing amplifier 74 with the voltage error signal VE from voltage error amplifier 72. From these two signals inverting summing amplifier 74 provides an output that is applied through diode 76 as first combined signal VE1, whose wave form is shown in FIG. 8A. This first combined signal VE1 is then applied to one side of the pulse width modulator (PWM comparator 78). The ramp signal from ramp generator 80 is applied to the other input of comparator 78, which then generates an output signal (FIG. 8C) that is subsequently used to generate control signal PWM1 for controlling the operation of the first circuit section (containing power transistor 4) of the applicable convertor circuit of FIGS. 1 through 3.

In this preferred embodiment the flux error signal VF from the flux error amplifier 64 is also inverted by inverting amplifier 82 and summed by summing amplifier 84 with the voltage error signal VE from voltage error amplifier 72. The output of summing amplifier 84 is applied through diode 86 as second combined signal VE2. This second combined signal VE2 is then compared in the second PWM comparator 88 with the ramp signal from ramp generator 80, as shown in FIG. 8A. The output (FIG. 8B) of the second PWM comparator 88 is then used to generate the pulse width modulation signal PWM2.

Figure 8D:
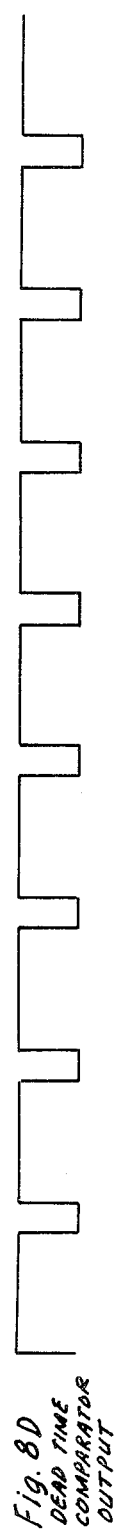
Figure 8E:
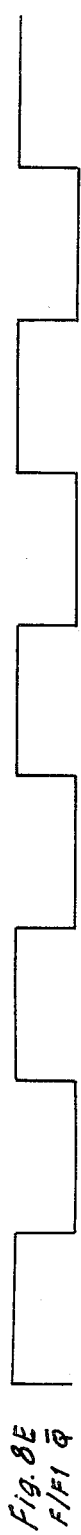
Figure 8F:
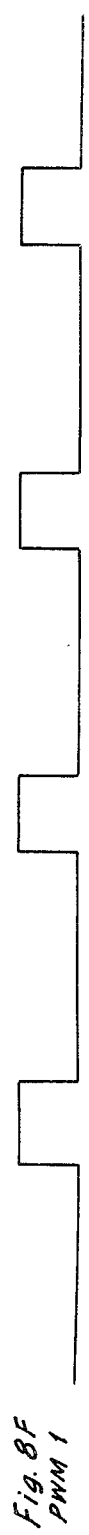
Figure 8G:

The outputs of both PWM comparators 78 and 88 are brought into OR gate 90, the output of which is fed to AND gate 92 along with a synchronizing signal from the ramp generator 80. The output of the AND gate 92 then serves to toggle the steering flip-flop control 94 between output Q and output Q. The Q and Q (FIG. 8E) outputs of steering flip-flop 94 control the AND gates 96 and 98 that pass the output signals from PWM comparators 78 and 88 to power transistors 4 and 6 as signals PWM1 (FIG. 8G) and PWM2, respectively. Thus the outputs of the respective PWM comparators 78 and 88 are switched alternately between their corresponding power transistors at half the frequency of the ramp signal from ramp generator 80.

In a manner analogous to that of the circuit of FIG. 5, dead time comparator 97 provides an output signal (FIG. 8D) requiring a predetermined period of dead time between the alternating activation of gates 96 and 98. This dead time prevents the gates 96 and 98, and thus the power transistors 4 and 6 and their corresponding first and second circuit sections, from being switched on simultaneously. A voltage divider network 99 controls the amount of dead time provided by the output signal from comparator 97.

Suitably the flux error amplifier 64, voltage error amplifier 72, summing amplifier 74, inverting amplifier 82 and summing amplifier 84 may all be National Semiconductor type 324. Conveniently, the PWM comparators 78 and 88 and the dead time comparator 97 may be National Semiconductor LM339 units.

A summary of the typical manner of operation of the apparatus of FIG. 7 is generally as follows: If it is assumed that the power transistor 4 of the convertor circuit of FIG. 1 is on longer and passes a wave form of greater amplitude than that of transistor 6, the wave form seen by the primary windings of both current transformer 12 and power transformer 16 is substantially as shown in FIG. 9A. As described above, the wave form of the current in the secondary winding of current transformer 12 will then be generally as shown in FIG. 9B. The voltage on the integrating device 58 in this particular operative situation will be negative, causing the output of the flux error amplifier 64 to be negative. This negative D.C. voltage is then summed with the output of voltage error amplifier 36 through inverting summing amplifier 74, causing the output of that inverting summing amplifier 74 to be more positive. This more positive characteristics results in a reduced pulse width at the PWM1 output controlling transistor 4, which reduces the on time of power transistor 4, which controls the first circuit section, and thus drives the D.C. on the integrating device 58 towards zero. In the same way, the output VF of the flux error amplifier 64 is inverted by amplifier 39 and summed by amplifier 84 with the voltage error amplifier 72 output VE. This results in a net increase in the pulse width of the signal PWM2 and thus in the duty cycle for power transistor 6, which controls the second circuit section which further reduces the D.C. on the integrating device 58.

Because a true integrator (having infinite gain at D.C.) is used, suitably in the form of capacitor 58, the unswitched D.C. current in the transformers is driven towards zero. While the correction may be applied to only one of the power transistors and thus one of the circuit sections of the convertor circuit, in the preferred embodiment the correction is bipolar and thus is not limited by the fact that one transistor may be operating at its maximum duty cycle. Thus the flux error amplifier is capable of controlling core flux even when the output voltage is not in regulation.

Any D.C. current in the secondary windings of the power transformer is likewise reflected to the primary as a shift in the primary current wave form by the same mechanism that causes the shift in the current transformer secondary wave form when D.C. is present in the primary, as described above. This wave form is then sensed by the current transformer in the same way as described above, and the D.C. error is corrected.

From all the foregoing it may be seen that this invention provides a new and broadly applicable method and apparatus for balancing the flux in switching power transformer circuits. It is to be noted that, while the foregoing description is directed to a particularly preferred embodiment of the invention, it is not to be considered limitative of the principles of the invention because numerous variations and modifications, all within the scope of the invention, will readily occur to those skilled in the art. Exemplary of such a variation or modification might be the use of a resistor and amplifier, or other suitable apparatus as the current sensing device, in place of the current transformer. Thus, the scope of the invention is to be determined solely by the claims appended hereto.

What is claimed is:

1. A method of balancing transformer flux in a switching power transformer circuit, which circuit employs pulse width modulation for regulation of output voltage and is driven by an input signal that approximates a square wave, that switches for each respective half cycle of operation between a first circuit section having during the active portion of its operation a first output signal with a first polarity and a second circuit section having during the active portion of its operation a second output signal with a polarity opposite the first polarity, which circuit includes a current sensing device connected in series with the primary winding of the power transformer, which circuit generates a voltage error signal by comparing the output voltage against a reference voltage, and which circuit includes a ramp signal generator for generating a ramp signal, said method comprising the steps of generating a signal proportional to the current flowing in the primary winding of said power transformer during said active portion of each half cycle of operation of said circuit that said current sensing device and said power transformer are being driven by said circuit;

integrating said power transformer current-proportional signal with time to generate a flux error signal;

combining said flux error signal with said voltage error signal to generate a first combined signal; and comparing said first combined signal with said ramp signal and generating from said comparison a signal for controlling the operation of said first circuit section, whereby the duty cycle of that first circuit section controlled by the first pulse width control signal may be adjusted to drive the flux error signal, and thus the direct current flux in the power transformer, toward zero.

2. The flux balancing method of claim 1 further comprising the steps of;
   combining the inverse of said flux error signal with said voltage error signal to generate a second combined signal; and
   comparing said second combined signal with said ramp signal and generating from said comparison a signal for controlling the operation of said second circuit section, whereby the duty cycle of that second circuit section controlled by the second pulse width control signal may be adjusted to drive the flux error signal and thus the direct current flux in the power transformer toward zero.

3. The flux balancing method of claim 2 further comprising the step of applying said first pulse width control signal to said first circuit section alternately with the application of said second pulse width control signal to said second circuit section and synchronously with the switching of said circuit between operation of said first circuit section and operation of said second circuit section.

4. The method of either of claims 1 or 2 wherein the step of generating a signal proportional to the current flowing in the primary winding of said power transformer comprises the steps of
   providing a D.C. signal corresponding to the current flowing in the current sensing device;
   sensing said active portions of said circuit operation; and
   passing said D.C. signal into said power transformer current signal integrating means only during said active portions of said circuit operation.

5. In a switching power transformer circuit that employs pulse width modulation for regulation of output voltage and is driven by an input signal that approximates a square wave, which circuit switches for each respective half cycle of operation between a first circuit section having during the active portion of its operation a first output signal with a first polarity, and a second circuit section having during the active portion of its operation a second output with a polarity opposite the first polarity, which circuit includes a current sensing device connected in series with the primary winding of the power transformer, which circuit generates a voltage error signal by comparing the output voltage against a reference voltage; and which circuit includes a ramp signal generator for generating a ramp signal, a transformer flux balancing apparatus comprising;
   means for generating a signal proportional to the current flowing in the primary winding of said power transformer during the active portion of each half cycle of operation of said circuit that said current sensing device and said power transformer are being driven by said circuit;
   means for integrating said power transformer current-proportional signal with time to generate a flux error signal;
   means for combining said flux error signal with said voltage error signal to generate a first combined signal; and
   first pulse width control signal generating means for comparing said first combined signal with said ramp signal and generating from said comparison a signal for controlling the operation of said first circuit section, whereby the duty cycle of that first circuit section controlled by the first pulse width control signal may be adjusted to drive the flux error signal, and thus the residual direct current flux in the power transformer, toward zero.

6. The flux balancing apparatus of claim 5 further comprising
   means for combining the inverse of said flux error signal with said voltage error signal to generate a second combined signal; and
   second pulse width control signal generating means for comparing said second combined signal with said ramp signal and generating from said comparison a signal for controlling the operation of said second circuit section, whereby the duty cycle of that second circuit section controlled by the second pulse width control signal may be adjusted to drive the flux error signal and thus the direct current flux in the power transformer, toward zero.

7. The flux balancing apparatus of claim 6 further comprising means for applying said first pulse width control signal to said first circuit section alternately with the application of said second pulse width control signal to said second circuit section and synchronously with the switching of said circuit between operation of said first circuit section and operation of said second circuit section.

8. The flux balancing apparatus of either claims of 5 or 6 wherein said power transformer current proportional signal generating means comprises
   means for providing a D.C. signal corresponding to the current flowing of said current sensing device;
   means for sensing said active portions of said circuit operation; and
   means for passing said D.C. signal into said power transformer current signal integrating means only during said active portions of said circuit operation.

9. The flux balancing apparatus of claim 8 wherein said power transformer current-proportional signal integrating means comprises capacitor means for receiving and storing said D.C. signal corresponding to the current flowing in the current sensing device, whereby the presence of any D.C. signal whose polarity is not switched with each half cycle of operation of the circuit will result in an increasing charge on the integrating capacitor means and thus the generation of the flux error signal.

10. The flux balancing apparatus of claim 8 wherein
   said circuit operation active portion sensing means comprises means both for sensing a signal that is provided in said power transformer secondary winding by either the active operation of said first circuit section or the active operation of said second circuit section and also for generating an output gating signal when said power transformer secondary winding signal is sensed; and
   said D.C. signal passing means comprises gating means activated by said output gating signal, whereby the gating means is activated to pass the D.C. signal only during the active portion of operation of the first circuit section and during the active portion of operation of the second circuit portion.

* * * * *

UNITED STATES PATENT AND TRADEMARK OFFICE
CERTIFICATE OF CORRECTION

PATENT NO. : 4,404,623

DATED : September 13, 1983

INVENTOR(S) : Charles S. Jourdan

It is certified that error appears in the above-identified patent and that said Letters Patent are hereby corrected as shown below:

Column 2 line 21, after "having" insert a comma (",");

line 23, after "operation" insert a comma (",");

line 24, after "having" insert a comma (",");

line 25, after "operation" insert a comma (",");

Column 3 line 15, change the title to read "DESCRIPTION OF THE PREFERRED EMBODIMENTS";

line 34, change "PMW1" to --PWM1--;

Column 6 line 41, after "resistors" insert a comma (",");

Column 7 line 13, change "output Q and output Q" to read --output Q and output $\overline{Q}$--, and change "The Q and Q" to read -- The Q and $\overline{Q}$--;

Column 8 line 41, after "having" insert a comma (",") and after "operation" insert a comma (",");

line 43, after "having" insert a comma (",") and after "operation" insert a comma (",");

Column 9 line 40, after "having" insert a comma (",") and after "operation insert a comma (",");

UNITED STATES PATENT AND TRADEMARK OFFICE
CERTIFICATE OF CORRECTION

PATENT NO. : 4,404,623  
DATED : September 13, 1983  
INVENTOR(S) : Charles S. Jourdan Page 2 of 2

It is certified that error appears in the above-identified patent and that said Letters Patent are hereby corrected as shown below:

line 42, after "having" insert a comma (","); line 43, after "operation" insert a comma (",").

Signed and Sealed this

Seventh Day of February 1984

[SEAL]

Attest:

GERALD J. MOSSINGHOFF

Attesting Officer

Commissioner of Patents and Trademarks